(12) United States Patent
Tsuda et al.

(10) Patent No.: US 7,247,677 B2
(45) Date of Patent: Jul. 24, 2007

(54) THERMOSETTING POWDER COATING COMPOSITION

(75) Inventors: Nobuhiko Tsuda, Settsu (JP); Ryoichi Fukagawa, Settsu (JP); Keisuke Tano, Settsu (JP); Daisuke Tanizawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 35 days.

(21) Appl. No.: 10/476,697

(22) PCT Filed: Jun. 4, 2002

(86) PCT No.: PCT/JP02/05498

§ 371 (c)(1),
(2), (4) Date: Nov. 5, 2003

(87) PCT Pub. No.: WO02/100956

PCT Pub. Date: Dec. 19, 2002

(65) Prior Publication Data
US 2004/0132915 A1 Jul. 8, 2004

(30) Foreign Application Priority Data
Jun. 8, 2001 (JP) .............................. 2001-174112

(51) Int. Cl.
*C08L 67/02* (2006.01)
*C08L 27/12* (2006.01)
*B05D 7/24* (2006.01)
*B05D 7/00* (2006.01)

(52) U.S. Cl. ................ 525/124; 525/326.1; 525/326.2; 525/326.3

(58) Field of Classification Search ................ 525/124, 525/326.1–326.3
See application file for complete search history.

(56) References Cited

U.S. PATENT DOCUMENTS 5,147,934 A * 9/1992 Ito et al. ..................... 525/124
5,914,283 A * 6/1999 Yamada et al. ............. 442/117

FOREIGN PATENT DOCUMENTS

| EP | 301557 B1 | | 9/1992 |
| EP | 483750 B1 | | 10/1994 |
| JP | 02-52074 | * | 2/1990 |
| JP | 02-60968 A | | 3/1990 |
| JP | 06-184243 A | | 7/1994 |
| WO | WO 99/57208 A1 | | 11/1999 |
| WO | WO 01/25354 A1 | | 4/2001 |

OTHER PUBLICATIONS

International Search Report for PCT/JP02/05498 dated Oct. 8, 2002.
English translation of International Preliminary Examination Report for PCT/JP02/05498 dated Oct. 8, 2003.

* cited by examiner

Primary Examiner—Frank Lawrence
Assistant Examiner—Ives Wu
(74) Attorney, Agent, or Firm—Sughrue Mion,. PLLC

(57) ABSTRACT

There is provided a thermosetting powder coating composition comprising (A1) a fluorine-containing copolymer and (B) a curing agent, in which the copolymer contains, as essential structural units, a fluoroolefin unit, an alkene unit and cyclohexyl vinyl ether unit and/or p-tertiary butyl vinyl benzoate unit, has a sum of cyclohexyl vinyl ether unit and p-tertiary butyl vinyl benzoate unit of from 5 to 45% by mole, has a thermal transition temperature of from 45° to 120° C. and has a crosslinkable reaction group. The thermosetting powder coating composition is excellent in storage stability and provides a coating film possessing a smooth surface and enhanced impact resistance.

10 Claims, No Drawings

THERMOSETTING POWDER COATING COMPOSITION

TECHNICAL FIELD

The present invention relates to a novel thermosetting powder coating composition, particularly a thermosetting powder coating composition which provides a cured coating film possessing improved impact resistance.

BACKGROUND ART

There are known compositions described, for example, in JP6-104792B as a thermosetting fluorine-containing powder coating composition. Also the present inventors have filed a patent application (Application No.: PCT/JP00/08802, Publication No. WO01/44390) with respect to a thermosetting fluorine-containing powder coating composition prepared from a fluorine-containing copolymer comprising tetrafluoroethylene (TFE), hexafluoropropylene (HFP), ethylene, hydroxybutyl vinyl ether (HBVE) and p-tertiary butyl vinyl benzoate (tBVBz). However there are no teachings with respect to amounts of ethylene and tBVBz in the copolymer and further thermal transition temperature and impact resistance of the obtained copolymer.

Also WO01/25346A1 and WO01/25354A1 disclose use of a TFE/HFP/ethylene/HBVE copolymer for a powder coating, and JP2000-26767A discloses use of a TFE/HFP/ethylene/perfluorobutenoic acid (PFBA) copolymer for a powder coating. Those patent publications disclose that impact resistance of a coating film at a coating thickness of 40 μm which is measured with an impact tester is 2.5 J.

With respect to a polymer for thermosetting powder coating, from the viewpoint of a mechanism of forming a coating film by heating and melting the polymer, it is necessary to increase a melt flowability of the polymer to increase smoothness of a coating film surface by decreasing a molecular weight of the polymer or decreasing a thermal transition temperature thereof. However if the molecular weight is decreased, there is a problem that impact resistance which is an essential characteristic of the coating film in its practical use is lowered. Also if the thermal transition temperature of the polymer is decreased, there is a problem that storage stability of an obtained powder coating composition is lowered or the powder is agglomerated in piping at coating.

The present inventors have made studies on those problems in a powder coating, and as a result, it was found that there is a close co-relation between an impact resistance of a coating film and a thermal transition temperature of a polymer. The relation is concretely such that when the thermal transition temperature of a polymer is increased, the impact resistance of a coating film is lowered. Accordingly a resin having a sufficiently high thermal transition temperature while having a practically satisfactory impact resistance (in evaluation at a coating thickness of 65 μm) has not been known.

DISCLOSURE OF INVENTION

The present invention relates to a thermosetting powder coating composition comprising (A1) a fluorine-containing copolymer and (B) a curing agent, in which the fluorine-containing copolymer contains, as essential structural units, a fluoroolefin unit, an alkene (R) unit and cyclohexyl vinyl ether (CHVE) unit and/or p-tertiary butyl vinyl benzoate (tBVBz) unit, has a sum of CHVE unit and tBVBz unit of from 5 to 45% by mole, has a thermal transition temperature of from 45° to 120° C. and has a crosslinkable reaction group.

In the present invention, "thermal transition temperature" means a variable polar point at which a polymer changes its physical properties due to a change in temperature, for example, a crystalline melting temperature (Tm) or a glass transition temperature (Tg) where a polymer starts softening. This is because in a powder coating, a temperature where a polymer starts softening is important for characteristics of a coating (storage stability, smoothness of a coating film surface at baking, etc.) and therefore it is necessary to know a softening starting point though there are polymers which have both of a crystalline melting temperature and a glass transition temperature, have a plurality of glass transition temperatures or have no crystalline melting temperature.

The thermal transition temperature is defined as a peak temperature of heat absorption (crystalline melting temperature, Tm) or a center point of a thermally variable polar point (glass transition temperature, Tg) which is observed in the second increase of temperature (2nd run) in a cycle comprising the first increase of temperature, the first decrease of temperature and the second increase of temperature according to ASTM D3418.

In the thermosetting powder coating composition, it is preferable that the fluorine-containing copolymer (A1) contains the CHVE unit and/or tBVBz unit in an amount of from 5 to 45% by mole and the alkene (R) unit in an amount of from 1 to 45% by mole.

Examples of preferred fluoroolefin unit in the fluorine-containing copolymer (A1) are tetrafluoroethylene (TFE), hexafluoropropylene (HFP) and/or chlorotrifluoroethylene (CTFE) units.

The present invention also relates to a fluorine-containing copolymer which comprises from 10 to 55% by mole of fluoroolefin unit, from 1 to 45% by mole of alkene (R) unit, from 0 to 45% by mole of CHVE unit, from 0 to 45% by mole of tBVBz unit, from 1 to 20% by mole of a structural unit having a crosslinkable reaction group and from 0 to 30% by mole of a structural unit other than the units mentioned above, has a sum of the CHVE unit and tBVBz unit of 5 to 45% by mole and has a thermal transition temperature of from 45° to 120° C.

The fluorine-containing copolymer can be prepared, for example, by proceeding the polymerization reaction while continuously supplying at least one of fluoroolefin, alkene, CHVE, tBVBz, monomer having a crosslinkable reaction group and as an optional component, monomer other than those mentioned above when copolymerizing those monomers.

Example of preferred alkene is ethylene.

The present invention also relates to a thermosetting powder coating composition which comprises (A2) a fluorine-containing copolymer containing a fluoroolefin unit, having a thermal transition temperature of from 45° to 120° C. and having a crosslinkable functional group and (B) a curing agent and provides a coating film having an impact resistance of not less than 3 J when measuring with an impact tester using a 65 μm thick coating film obtained by coating and curing the composition.

It is preferable that the fluorine-containing copolymer (A2) further contains the alkene (R) unit, particularly an ethylene (E) unit and it is preferable from the viewpoint of an increase in thermal transition temperature that the copolymer further contains the cyclohexyl vinyl ether unit and/or the p-t-butyl vinyl benzoate unit. It is desirable that the alkene unit is contained in an amount of from 1 to 45% by mole.

BEST MODE FOR CARRYING OUT THE INVENTION

The thermosetting powder coating composition of the present invention comprises the specific fluorine-containing copolymer (A1) having a high thermal transition temperature and the curing agent (B).

The specific fluorine-containing copolymer (A1) which is a feature of the present invention is a copolymer which contains, as essential structural units, a fluoroolefin unit, an alkene (R) unit, and CHVE unit and/or tBVBz unit, and has a sum of CHVE unit and tBVBz unit of from 5 to 45% by mole. The copolymer has a high thermal transition temperature of from 45° to 120° C. which has not been obtained in conventional copolymers.

First, the specific fluorine-containing copolymer is explained below.

Examples of fluoroolefin for the fluoroolefin unit are tetrafluoroethylene (TFE), chlorotrifluoroethylene (CTFE), trifluoroethylene (TrF), vinylidene fluoride (VdF), hexafluoropropylene (HFP), pentafluoropropylene and the like. Fluoroolefin can be optionally selected depending on required characteristics of a coating film and a combination with copolymerizable components or a curing agent. Those fluoroolefins can be used solely or in a mixture of two or more thereof. Preferred fluoroolefins are TFE, CTFE and HFP.

The content of fluoroolefin unit is from 10 to 55% by mole, preferably from 30 to 50% by mole. If the content of fluoroolefin unit becomes lower, weather resistance which is a characteristic of a fluorine-containing resin cannot be obtained, and if the content of fluoroolefin unit is too high, compatibility with a curing agent is lowered, adhesion to a substrate is lowered and the obtained powder coating is not suitable as a fluorine-containing powder coating.

In the fluorine-containing copolymer of the present invention, it is important that the alkene unit and CHVE unit and/or tBVBz unit are contained as essential components and further the thermal transition temperature of the copolymer is from 45° to 120° C.

Even in the case where alkene is not contained as a structural unit, the thermal transition temperature of the copolymer can be increased when the CHVE and/or tBVBz unit are contained. However in the case of the fluorine-containing copolymer not containing alkene, even if the thermal transition temperature is not less than 45° C., impact resistance of an obtained coating film is lowered extremely.

Examples of preferred alkene are low molecular weight compounds having up to 6 carbon atoms such as ethylene (E), propylene (P), n-butene, isobutene (iB), pentene and hexene. Particularly preferred is ethylene from the viewpoint of hardness of a coating film.

A lower limit of the thermal transition temperature of the fluorine-containing copolymer is 45° C., preferably 50° C., and an upper limit thereof is 120° C., preferably 90° C. If the thermal transition temperature lowers, there is a tendency that special facilities such as a low temperature storage for storing an obtained coating composition are required. Particularly when the thermal transition temperature is less than 45° C., such a tendency appears significantly. On the other hand, if the thermal transition temperature exceeds 120° C., smoothness of a surface of a formed coating film is lowered.

In the present invention, the content of CHVE unit is from 0 to 45% by mole, preferably from 5 to 45% by mole. Also the content of tBVBz unit is from 0 to 45% by mole, preferably from 5 to 45% by mole. A sum of the CHVE unit and the tBVBz unit is from 5 to 45% by mole. When the sum of the CHVE unit and the tBVBz unit is less than 5% by mole, the thermal transition temperature of the polymer is not increased sufficiently for practical use. When the sum exceeds 45% by mole, it is not preferable because weather resistance of the formed coating film is lowered.

When the tBVBz unit is not contained in the polymer, it is preferable that the CHVE unit is contained in an amount of from 20 to 45% by mole.

Also when the CHVE unit is not contained in the polymer, it is preferable that the tBVBz unit is contained in an amount of from 5 to 20% by mole.

It is preferable that the alkene unit is contained in an amount of from 1 to 45% by mole. If the content of alkene unit is less than 1% by mole, improvement of impact resistance which results from copolymerization of alkene is not recognized and in case of more than 45% by mole, thermal transition temperature of the polymer exceeds 120° C., and therefore there is a case where processability at forming into a paint is lowered and smoothness of a surface of a coating film is lowered. More preferable proportion of the alkene unit is from 30 to 45% by mole. With respect to the improvement of impact resistance, even in case of a small content of the alkene unit, an effect of copolymerization thereof can be recognized, and particularly in the range of from 30 to 45% by mole, an effect of improving impact resistance can be exhibited significantly.

Examples of the structural unit having a crosslinkable reaction group which is one of the structural units of the fluorine-containing copolymer of the present invention are structural units having hydroxyl group, carboxyl group, amide group, amino group, mercapto group, glycidyl group, nitrile group, isocyanate group or the like as the crosslinkable reaction group. For introducing such a crosslinkable reaction group to the copolymer, there are a method of copolymerizing monomer having a crosslinkable reaction group (copolymerization method), a method of decomposing a part of functional groups in the copolymer to convert to a reactive functional group (post-conversion method), a method of reacting the functional group in the copolymer with a compound having a crosslinkable reaction group (high molecular reaction method) and the like method. Among them, the copolymerization method is preferred from the point that a necessary amount of functional groups can be efficiently introduced nearly quantitatively.

As the monomer having hydroxyl group or a group convertible to hydroxyl group, there can be used monomers having a double bond copolymerizable with fluoroolefin. Examples thereof are, for instance, hydroxyalkyl vinyl ethers such as hydroxyethyl vinyl ether, hydroxypropyl vinyl ether, hydroxybutyl vinyl ether, hydroxyisobutyl vinyl ether and hydroxycyclohexyl vinyl ether; vinyl esters of hydroxyalkyl carboxylic acid such as vinyl hydroxyacetate, vinyl hydroxypropionate, vinyl hydroxybutyrate, vinyl hydroxyvalerate, vinyl hydroxyisobutyrate and vinyl hydroxycyclohexane carboxylate; hydroxyalkyl allyl ethers such as hydroxyethyl allyl ether, hydroxypropyl allyl ether, hydroxybutyl allyl ether, hydroxyisobutyl allyl ether and hydroxycyclohexyl allyl ether; hydroxy allyl esters such as hydroxyethyl allyl ester, hydroxypropyl allyl ester, hydroxybutyl allyl ester, hydroxyisobutyl allyl ester and hydroxycyclohexyl allyl ester; compounds obtained by subjecting the above-mentioned monomers to partly substituting with fluorine; and the like. Those monomers may be used solely or in a mixture thereof.

Examples of the monomer having carboxyl group are, for instance, α,β-unsaturated carboxylic acids such as acrylic acid, methacrylic acid, itaconic acid, succinic acid, succinic anhydride, fumaric acid, fumaric anhydride, crotonic acid, maleic acid and maleic anhydride, and fluorine-substituted α,β-unsaturated carboxylic acids such as perfluorobutenoic acid.

Examples of the monomer having glycidyl group are, for instance, glycidyl (meth)acrylate, glycidyl vinyl ether, glycidyl allyl ether and the like.

Examples of the monomer having amino group are, for instance, aminoalkyl vinyl ether, aminoalkyl allyl ether and the like. Examples of the monomer having amide group are, for instance, (meth)acrylamide, methylolacrylamide and the like.

Examples of the monomer having nitrile group are, for instance, (meth)acrylonitrile and the like. Examples of the monomer having isocyanate group are, for instance, vinyl isocyanate, isocyanate ethyl acrylate and the like.

Among those monomers providing a crosslinkable reaction site, particularly preferred are vinyl or allyl compounds from the viewpoint of good copolymerizability with fluoroolefin. Among them, preferred are vinyl or allyl monomers having hydroxyl group from the viewpoint of good reactivity of the coating composition, and further particularly preferred are vinyl ethers having hydroxyl group from the viewpoint of good copolymerization reactivity.

Example of the post-conversion method of decomposing a part of the copolymer is a method of, after copolymerizing a monomer having a hydrolyzable ester group, hydrolyzing the copolymer to generate carboxyl group in the copolymer. Also a crosslinkage can be formed by directly carrying out the crosslinking reaction by ester interchange reaction without hydrolysis of ester. As the high molecular reaction method in which a compound providing a crosslinkable reaction group is reacted with the copolymer, there can be suitably employed a method of introducing carboxyl group by reacting a divalent anhydrous carboxylic acid such as succinic anhydride with the hydroxyl-containing copolymer prepared by the above-mentioned method.

The content of structural unit having a crosslinkable reaction group is from 1 to 20% by mole, preferably from 3 to 15% by mole. If the content is too high, impact resistance is lowered, and if the content is too low, hardness of a coating film is lowered.

In addition to the above-mentioned essential monomers, copolymerizable comonomers can be copolymerized with the fluorine-containing copolymer to be used in the present invention within limits not impairing the object of the present invention. The comonomers may be those which have an unsaturated group so active as being copolymerizable with fluoroolefin and do not lower weather resistance of a coating film significantly. For example, ethylenic unsaturated compounds are preferred. Examples thereof are, for instance, alkyl vinyl ethers such as ethyl vinyl ether, propyl vinyl ether, butyl vinyl ether and isobutyl vinyl ether; vinyl esters of alkyl carboxylic acid such as vinyl acetate, vinyl propionate, vinyl butyrate, vinyl isobutyrate, vinyl valerate and vinyl cyclohexane carboxylate; alkyl allyl ethers such as ethyl allyl ether, propyl allyl ether, butyl allyl ether, isobutyl allyl ether and cyclohexyl allyl ether; alkyl allyl esters such as ethyl allyl ester, propyl allyl ester, butyl allyl ester, isobutyl allyl ester and cyclohexyl allyl ester; alkenes such as ethylene, propylene, butylene and isobutylene; acrylates and methacrylates such as ethyl acrylate, propyl acrylate, butyl acrylate, isobutyl acrylate, 2-ethylhexyl acrylate, ethyl methacrylate, propyl methacrylate, butyl methacrylate, isobutyl methacrylate and 2-ethylhexyl methacrylate; compounds obtained by subjecting the above-mentioned monomers to partly substituting with fluorine; and the like. Those comonomers may be used solely or in combination of two or more thereof. Among those comonomers, particularly preferred are vinyl and allyl compounds and alkenes which are excellent in copolymerizability with fluoroolefin. When vinyl or allyl alkyl esters or alkyl ethers are used, preferred alkyl are linear, branched or alicyclic ones having about 2 to about 10 carbon atoms.

Those comonomers are optional components and may be contained in an amount of from 0 to 30% by mole, usually from 0 to 10% by mole to the purpose of copolymerization thereof.

Non-restricted examples of the specific fluorine-containing copolymer in the present invention are CTFE/E/CHVE/HBVE copolymer, TFE/E/CHVE/HBVE copolymer, TFE/HFP/E/CHVE/HBVE copolymer, CTFE/E/tBVBz/HBVE copolymer, TFE/E/tBVBz/HBVE copolymer, TFE/HFP/E/tBVBz/HBVE copolymer, TFE/HFP/P/tBVBz/HBVE copolymer, TFE/iB/HBVE copolymer, TFE/iB/tBVBz/HBVE copolymer and the like.

It is particularly preferable that the fluorine content of the specific fluorine-containing copolymer which is used for the thermosetting powder coating composition of the present invention is not less than 10% by weight. If the fluorine content in the fluorine-containing copolymer is less than 10% by weight, there is a case where a coating film having sufficient weather resistance cannot be obtained. An upper limit of the fluorine content is about 60% by weight.

In the present invention it is particularly preferable that the number average molecular weight Mn of the specific fluorine-containing copolymer which is measured based on styrene with gel permeation chromatography (GPC) is in a range of from 10,000 to 50,000. If Mn is not more than 10,000, impact resistance directed by the present invention is lowered, and if Mn exceeds 50,000, there is a tendency that surface smoothness of an obtained coating film is lowered.

In the present invention, in order to prepare the specific fluorine-containing copolymer, usual solution polymerization method may be employed, but in order to prepare a copolymer having a high thermal transition temperature and a high impact resistance, it is preferable to continuously supply at least one of the above-mentioned monomers during the polymerization reaction. It is particularly preferable to continuously supply, for example, with a liquid pump, CHVE and/or tBVBz which are in the form of liquid in a usual state and as case demands, monomer for introducing functional group depending on intended composition of the copolymer. When those monomers are added dividedly at given intervals, a copolymer having an intended composition can be obtained. However impact resistance of a coating film of a coating powder obtained from the thus obtained copolymer tends to be lowered as compared with that of the coating film of a powder coating obtained from the copolymer prepared by continuously supplying monomers.

The thermosetting powder coating composition of the present invention contains a curing agent.

Generally blocked isocyanate compounds are used as a curing agent. There are, for example, compounds obtained by blocking an isocyanate group of isocyanate compounds such as polyisocyanate compounds such as isophorone diisocyanate, tolylene diisocyanate, xylylene diisocyanate, 4,4'-diphenylmethane diisocyanate and hexamethylene diisocyanate, dimers and trimers thereof and polyisocyanate compounds modified with a polyhydric alcohol such as trimethylolpropane, with a blocking agent such as ε-caprolactam, phenol, benzyl alcohol or methyl ethyl ketoxime. The blocked isocyanate compounds which can be used suitably are those which are in the form of solid at room temperature.

Examples of other curing agent are aliphatic dibasic acids such as fumaric acid, succinic acid, adipic acid, azelaic acid, sebacic acid and dodecandioic acid; acid anhydrides such as phthalic anhydride, trimellitic acid anhydride and pyromellitic anhydride; dicyandiamide and dicyandiamide derivative; imidazole and imidazole derivative; dibasic acid dihydrazide; amine compounds such as diaminophenyl methane and cyclic amidine compounds; melamine resin; glycidyl compounds such as diglycidyl terephthalate, diglycidyl p-hydroxybenzoate, triglycidyl isocyanate, spiroglycol diglycidylether, hydantoin compound and alicyclic epoxy compound; and in addition, 1,4-bis2'-hydroxyethoxybenzene, bishydroxyethyl terephthalate, styrene/allyl alcohol copolymer, spiroglycol, tris2-hydroxyethyl isocyanurate and the like. The other curing agent which can be suitably used are those being in the form of solid at room temperature.

In the thermosetting powder coating composition of the present invention, the fluorine-containing copolymer (A1) and the curing agent (B) can be mixed in a weight ratio of 40:60 to 98:2, preferably 50:50 to 97:3.

To the thermosetting powder coating composition of the present invention can be added, as third components, additives which are usually used for a coating composition. Namely, as case demands, there can be added one or more of color pigments (for example, inorganic pigments such as titanium dioxide, red iron oxide, yellow iron oxide and carbon black, and organic pigments such as phthalocyanine blue, phthalocyanine green, quinacridone red pigment and isoindolinone yellow pigment); extender pigments such as talc, silica and calcium carbonate; metal powders such as aluminum powder and stainless steel powder; other additives such as mica powder, leveling agent, ultraviolet absorber, thermal degradation inhibitor and defoaming agent; and the like.

In the present invention, the above-mentioned third components which are added as case demands may be previously mixed to the fluorine-containing copolymer component (A1) or the curing agent component (B) of the thermosetting powder coating composition. The composition of the present invention can be prepared in the same manner as in preparation of known thermosetting powder coating composition.

The so-prepared thermosetting powder coating composition has a particle size of not more than 400 μm. The composition is uniformly coated on metal such as iron, aluminum, copper, zinc or alloys thereof, for example, stainless steel or brass, for example, with a commercially available electrostatic powder coating equipment, fluid bed coating equipment or the like and then is subjected to baking in a hot air oven, infrared oven, induction heater or the like. Thus a desired coating film can be formed.

Among the above-mentioned specific fluorine-containing copolymers (A1), the fluorine-containing copolymer which comprises 10 to 55% by mole of fluoroolefin unit, 1 to 45% by mole of alkene unit, 0 to 45% by mole of CHVE unit, 0 to 45% by mole of tBVBz unit, 1 to 20% by mole of a structural unit having a crosslinkable reaction group and 0 to 30% by mole of a structural unit other than the above units, has a sum of CHVE unit and tBVBz unit of 5 to 45% by mole and has a thermal transition temperature of 45° to 120° C., is a novel copolymer.

Next, the powder coating composition of the present invention providing a coating film being excellent particularly in impact resistance is explained below.

The powder coating composition is the thermosetting powder coating composition which comprises (A2) the fluorine-containing copolymer containing a fluoroolefin unit, having a crosslinkable functional group and having a thermal transition temperature of from 45° to 120° C. and (B) the curing agent, and provides a coating film having impact resistance of not less than 3 J when measuring with an impact tester using a 65 μm thick coating film obtained by coating and then curing the composition.

With respect to the fluoroolefin unit, thermal transition temperature, crosslinkable functional group and curing agent of this powder coating composition, the explanations mentioned supra can be applied thereto.

It is preferable that the fluorine-containing copolymer (A2) contains an alkene (R) unit, particularly an ethylene (E) unit and it is further preferable that the fluorine-containing copolymer (A2) contains a CHVE unit and/or tBVBz unit from the viewpoint of increasing a thermal transition temperature. It is desirable that the alkene unit is contained in an amount of from 1 to 45% by mole. Particularly preferred fluorine-containing copolymer (A2) is the fluorine-containing copolymer (A1) mentioned supra.

From the viewpoint of impact resistance of a coating film, in the prior art documents including the above-mentioned WO publications, there are only coating films having impact resistance at a thickness of 40 μm, which is still insufficient in the light of strict characteristic demanded recently (impact resistance at a coating thickness of 65 μm). In the evaluation of impact resistance with an impact tester, in case of using the same composition, as a coating thickness increases, a value (J) of impact resistance decreases. Namely, when impact resistance is measured at a coating thickness of 65 μm using a composition providing a coating film having impact resistance of 3.0 J at a thickness of 40 μm, the impact resistance becomes lower than 3.0 J (Impact resistance is evaluated at intervals of 0.5 J with an impact tester).

Impact resistance (at a coating thickness of 65 μm) is not less than 3.0 J, preferably not less than 4.0 J. An upper limit thereof is not limited particularly and the higher, the better. However if the upper limit is too high, lowering of surface smoothness and hardness of a coating film need be considered. Therefore the upper limit is 10.0 J, further 9.0 J.

The present invention is then explained by means of preparation examples and experimental examples, but is not limited to them.

PREPARATION EXAMPLE 1

A 4,000 ml stainless steel autoclave was charged with 760 g of deionized water and 7 g of potassium carbonate, and pressurizing with nitrogen gas and deaeration were repeated three times to remove dissolved oxygen. Then 660 g of 1,1,1-trifluoro-3,3-difluoropropane (HFC245fa), 260 g of HFP, 3 g of HBVE and 4.5 g of tBVBz were introduced under reduced pressure and the inside temperature was adjusted to 35° C. Further the inside pressure was adjusted to 0.9 MPaG (9 kgf/cm$^2$G) with a monomer mixture of TFE/ethylene having a % by mole ratio of 82/18 and then 35 g of monochloropentafluoropropane (HCFC225) solution of 25% by weight of isobutyryl peroxide was introduced to start a reaction. Since decrease in the inside pressure occurred with the advance of the reaction, 65 g of a monomer mixture of TFE/ethylene/HFP having a % by mole ratio of 45/39/16, 15 g of HBVE and 30 g of tBVBz were continuously introduced over six hours while maintaining the inside pressure at 0.9 MPaG (9 kgf/cm²G). Six hours after, the inside temperature and pressure of the autoclave were lowered to normal temperature and pressure to terminate the reaction.

The obtained solid was washed and then dried to obtain 110 g of a white powder of fluorine-containing copolymer.

According to ¹⁹F-NMR, ¹H-NMR and elementary analyses, the obtained fluorine-containing copolymer was a copolymer comprising 35% by mole of TFE, 36% by mole of ethylene, 12% by mole of HFP, 10% by mole of tBVBz and 7% by mole of HBVE. The thermal transition temperature thereof was 53° C. and the number average molecular weight Mn measured based on styrene by GPC was 17,000.

Physical properties (hydroxyl value, thermal transition temperature, number average molecular weight Mn) of the obtained fluorine-containing copolymer are shown in Table 1.

PREPARATION EXAMPLES 2 to 7

Fluorine-containing copolymers of Preparation Examples 2 to 7 were prepared in the same manner as in Preparation Example 1 except that a continuously supplied amount of a monomer mixture of TFE/ethylene/HFP (% by mole ratio of 45/39/16), initial amounts and continuously supplied amounts of HBVE and tBVBz, and polymerization reaction time were changed as shown in Table 1. Yield, components and physical properties of the obtained fluorine-containing copolymer are shown in Table 1.

PREPARATION EXAMPLE 8

A 4,000 ml stainless steel autoclave equipped with a stirrer was charged with 1,000 g of t-butanol, 208 g of CHVE, 24 g of ethylene, 50 g of HBVE, 5 g of potassium carbonate and 0.5 g of azobis isobutyronitrile, and dissolved oxygen was removed by solid deaeration with liquid nitrogen. Then 330 g of chlorotrifluoroethylene (CTFE) was introduced and the inside temperature of the autoclave was increased gradually. A reaction was continued with stirring while maintaining a reaction temperature at 65° C. 10 Hours after, the reactor was water-cooled to terminate the reaction. After cooling to room temperature, un-reacted monomer was removed and the reactor was opened to remove a fluorine-containing copolymer. The copolymer was heated to 60° C. and a dispersion medium was removed over 24 hours under reduced pressure of 1 mmHg. Then the copolymer was pulverized with an impact hammer mill to obtain a fluorine-containing copolymer.

Yield, components and physical properties of the obtained fluorine-containing copolymer are shown in Table 1.

PREPARATION EXAMPLE 9

A 4,000 ml stainless steel autoclave was charged with 760 g of deionized water and 7 g of potassium carbonate, and pressurizing with nitrogen gas and deaeration were repeated three times to remove dissolved oxygen. Then 660 g of HFC245fa, 260 g of HFP, 3 g of HBVE and 4.5 g of tBVBz were introduced under reduced pressure and the inside temperature was adjusted to 35° C. Further the inside pressure was adjusted to 0.9 MPaG (9 kgf/cm²G) with a monomer mixture of TFE/ethylene having a % by mole ratio of 82/18 and then 35 g of HCFC225 solution of 25% by weight of isobutyryl peroxide was introduced to start a reaction. Since decrease in the inside pressure occurred with the advance of the reaction, 65 g of a monomer mixture of TFE/ethylene/HFP having a % by mole ratio of 45/39/16 was continuously introduced over six hours while maintaining the inside pressure at 0.9 MPaG (9 kgf/cm²G). 1.5 Hours, 3 hours and 4.5 hours, respectively after starting of the reaction, 5 g of HBVE and 10 g of tBVBz were dividedly introduced. Six hours after, the inside temperature and pressure of the autoclave were lowered to normal temperature and pressure to terminate the reaction. The obtained solid was washed and then dried to obtain a white powder of fluorine-containing copolymer.

Yield, components and physical properties of the obtained fluorine-containing copolymer are shown in Table 1.

PREPARATION EXAMPLE 10

A 4,000 ml stainless steel autoclave was charged with 760 g of deionized water and 7 g of potassium carbonate, and pressurizing with nitrogen gas and deaeration were repeated three times to remove dissolved oxygen. Then 660 g of HFC245fa, 260 g of HFP, 3 g of HBVE and 12 g of CHVE were introduced under reduced pressure and the inside temperature was adjusted to 35° C. Further the inside pressure was adjusted to 0.9 MPaG (9 kgf/cm²G) with a monomer mixture of TFE/HFP having a % by mole ratio of 75/25 and then 35 g of HCFC225 solution of 25% by weight of isobutyryl peroxide was introduced to start a reaction. Since decrease in the inside pressure occurred with the advance of the reaction, 65 g of a monomer mixture of TFE/HFP having a % by mole ratio of 75/25, 18 g of HBVE and 28 g of CHVE were continuously introduced over six hours while maintaining the inside pressure at 0.9 MPaG (9 kgf/cm²G). Six hours after, the inside temperature and pressure of the autoclave were lowered to normal temperature and pressure to terminate the reaction. The obtained solid was washed and then dried to obtain a white powder of fluorine-containing copolymer.

Yield, components and physical properties of the obtained fluorine-containing copolymer are shown in Table 1.

PREPARATION EXAMPLE 11

A 4,000 ml stainless steel autoclave was charged with 760 g of deionized water and 7 g of potassium carbonate, and pressurizing with nitrogen gas and deaeration were repeated three times to remove dissolved oxygen. Then 660 g of HFC245fa, 260 g of HFP, 3 g of HBVE and 12 g of CHVE were introduced under reduced pressure and the inside temperature was adjusted to 35° C. Further the inside pressure was adjusted to 0.9 MPaG (9 kgf/cm²G) with a monomer mixture of TFE/ethylene/HFP having a % by mole ratio of 45/39/16 and then 35 g of HCFC225 solution of 25% by weight of isobutyryl peroxide was introduced to start a reaction. Since decrease in the inside pressure occurred with the advance of the reaction, 65 g of a monomer mixture of TFE/ethylene/HFP having a % by mole ratio of 45/39/16, 18 g of HBVE and 28 g of CHVE were continuously introduced over six hours while maintaining the inside pressure at 0.9 MPaG (9 kgf/cm²G). Six hours after, the inside temperature and pressure of the autoclave were lowered to normal temperature and pressure to terminate the reaction.

The obtained solid was washed and then dried to obtain a white powder of fluorine-containing copolymer.

Yield, components and physical properties of the obtained fluorine-containing copolymer are shown in Table 1.

PREPARATION EXAMPLE 12

A 4,000 ml stainless steel autoclave was charged with 760 g of deionized water and 7 g of potassium carbonate, and pressurizing with nitrogen gas and deaeration were repeated three times to remove dissolved oxygen. Then 660 g of 1,1,1-trifluoro-3,3-difluoropropane (HFC245fa), 260 g of HFP, 3 g of HBVE and 4.5 g of tBVBz were introduced under reduced pressure and the inside temperature was adjusted to 35° C. Further the inside pressure was adjusted to 0.9 MPaG (9 kgf/cm$^2$G) with a monomer mixture of TFE/propylene having a % by mole ratio of 80/20 and then 35 g of monochloropentafluoropropane (HCFC225) solution of 25% by weight of isobutyryl peroxide was introduced to start a reaction. Since decrease in the inside pressure occurred with the advance of the reaction, 70 g of a monomer mixture of TFE/propylene/HFP having a % by mole ratio of 45/39/16, 15 g of HBVE and 30 g of tBVBz were continuously introduced over five hours while maintaining the inside pressure at 0.9 MPaG (9 kgf/cm$^2$G). Five hours after, the inside temperature and pressure of the autoclave were lowered to normal temperature and pressure to terminate the reaction.

The obtained solid was washed and then dried to obtain a white powder of fluorine-containing copolymer.

Yield, components and physical properties of the obtained fluorine-containing copolymer are shown in Table 1.

PREPARATION EXAMPLE 13

A 4,000 ml stainless steel autoclave was charged with 760 g of deionized water and 7 g of potassium carbonate, and pressurizing with nitrogen gas and deaeration were repeated three times to remove dissolved oxygen. Then 572 g of chlorofluoroethane (HCFC141b), 340 g of HFP and 3 g of HBVE were introduced under reduced pressure and the inside temperature was adjusted to 35° C. Further the inside pressure was adjusted to 0.9 MPaG (9 kgf/cm$^2$G) with a monomer mixture of TFE/ethylene having a % by mole ratio of 82/18 and then 4 g of cyclohexane and 24 g of monochloropentafluoropropane (HCFC225) solution of 25% by weight of isobutyryl peroxide were introduced to start a reaction. Since decrease in the inside pressure occurred with the advance of the reaction, a monomer mixture of TFE/ethylene/HFP having a % by mole ratio of 45/39/16 was continuously introduced while maintaining the inside pressure at 0.9 MPaG (9 kgf/cm$^2$G). Every six hours, 1.5 g of HBVE and 12 g of monochloropentafluoropropane (HCFC225) solution of 25% by weight of isobutyryl peroxide were additionally introduced to continue the reaction for 12 hours. Then the inside temperature and pressure of the autoclave were lowered to normal temperature and pressure to terminate the reaction.

The obtained solid was washed and then dried to obtain 152 g of a white powder of fluorine-containing copolymer.

Yield, components and physical properties of the obtained fluorine-containing copolymer are shown in Table 1.

PREPARATION EXAMPLE 14

A 4,000 ml stainless steel autoclave was charged with 1,000 g of deionized water, and pressurizing with nitrogen gas and deaeration were repeated three times to remove dissolved oxygen. Then 407 g of chlorofluoroethane (HCFC141b), 15 g of perfluorobutenoic acid (PFBA) and 794 g of HFP were introduced under reduced pressure and the inside temperature was adjusted to 35° C. Further the inside pressure was adjusted to 1.2 MPaG (12 kgf/cm$^2$G) with a monomer mixture of TFE/ethylene having a % by mole ratio of 82/18 and then 4 g of cyclohexane and 48 g of monochloropentafluoropropane (HCFC225) solution of 25% by weight of isobutyryl peroxide were introduced to start a reaction. Since decrease in the inside pressure occurred with the advance of the reaction, a monomer mixture of TFE/ethylene having a % by mole ratio of 82/18 was continuously introduced while maintaining the inside pressure at 1.2 MPaG (12 kgf/cm$^2$G). Every three hours, 3 g of PFBA and 8 g of monochloropentafluoropropane (HCFC225) solution of 25% by weight of isobutyryl peroxide were additionally introduced to continue the reaction for 12 hours. Then the inside temperature and pressure of the autoclave were lowered to normal temperature and pressure to terminate the reaction.

The obtained solid was washed and then dried to obtain 133 g of a white powder of fluorine-containing copolymer.

Yield, components and physical properties of the obtained fluorine-containing copolymer are shown in Table 1.

PREPARATION EXAMPLE 15

A 4,000 ml stainless steel autoclave was charged with 1,570 g of t-butanol, 160 g of CHVE, 90 g of isobutyl vinyl ether (isoBVE), 250 g of HBVE, 10 g of potassium carbonate and 0.7 g of azobis isobutyronitrile (AIBN), and dissolved oxygen was removed by solid deaeration with liquid nitrogen. Then 500 g of chlorotrifluoroethylene (CTFE) was introduced and the inside temperature of the autoclave was increased gradually. A reaction was continued with stirring while maintaining a reaction temperature at 65° C. 10 Hours after, the reactor was water-cooled to terminate the reaction. After cooling to room temperature, un-reacted monomer was removed and the reactor was opened to remove a fluorine-containing copolymer. The copolymer was heated to 60° C. and the dispersion medium was removed over 24 hours under reduced pressure of 1 mmHg. Then the copolymer was pulverized with an impact hammer mill to obtain a powder.

Yield, components and physical properties of the obtained fluorine-containing copolymer are shown in Table 1.

The copolymers of Preparation Examples 1, 2, 5, 6, 8, 9, 11 and 12 correspond to the specific fluorine-containing copolymer (A1) of the present invention. Preparation Examples 3, 4, 7, 10 and 13 to 15 are Comparative Preparation Examples. Particularly the copolymer of Preparation Example 13 corresponds to the fluorine-containing copolymer described in Preparation Example 1 of WO01/25346 (and Preparation Example 2 of WO01/25354), the copolymer of Preparation Example 14 corresponds to the fluorine-containing copolymer described in Example 1 of JP2000-26767A and the copolymer of Preparation Example 15 corresponds to the fluorine-containing copolymer described in Example 1 of JP6-104792A.

TABLE 1

|  | Preparation Example | | | | | | | |
|---|---|---|---|---|---|---|---|---|
|  | 1 | 2 | 3 | 4 | 5 | 6 | 7 | 8 |
| Initially charged HBVE (g) | 3 | 4 | 5 | 3 | 3 | 4 | 3 | 50 |
| Continuously supplied HBVE (g) | 15 | 18 | 24 | 13 | 13 | 19 | 13 | — |
| Initially charged tBVBz (g) | 4.5 | 3 | 2 | 4 | 8 | 4 | 13 | — |
| Continuously supplied tBVBz (g) | 30 | 22 | 11 | 32 | 58 | 30 | 97 | — |
| Initially charged CHVE (g) | — | — | — | — | — | — | — | 208 |
| Continuously supplied CHVE (g) | — | — | — | — | — | — | — | — |
| Initially charged PFBA (g) | — | — | — | — | — | — | — | — |
| Continuously supplied PFBA (g) | — | — | — | — | — | — | — | — |
| Amount of monomer mixture (g) | 65 | 66 | 70 | 59 | 49 | 59 | 28 | — |
| Reaction time (hr) | 6 | 6 | 7 | 4 | 6 | 6 | 5 | 10 |
| Amount of fluorine-containing copolymer (g) | 110 | 104 | 100 | 107 | 117 | 105 | 142 | 487 |
| Components of copolymer (% by mole) | | | | | | | | |
| TFE | 35 | 36 | 34 | 37 | 31 | 31 | 30 | — |
| HFP | 12 | 10 | 12 | 3 | 11 | 9 | 5 | — |
| CTFE | — | — | — | — | — | — | — | 48 |
| E | 36 | 40 | 41 | 47 | 31 | 44 | 9 | 15 |
| CHVE | — | — | — | — | — | — | — | 29 |
| tBVBz | 10 | 6 | 3 | 8 | 20 | 8 | 46 | — |
| HBVE | 7 | 8 | 10 | 5 | 7 | 8 | 10 | 8 |
| P | — | — | — | — | — | — | — | — |
| PFBA | — | — | — | — | — | — | — | — |
| isoBVE | — | — | — | — | — | — | — | — |
| Total | 100 | 100 | 100 | 100 | 100 | 100 | 100 | 100 |
| Physical properties of polymer | | | | | | | | |
| Hydroxyl value (mgKOH/g) | 43 | 54 | 69 | 37 | 37 | 54 | 39 | 42 |
| Thermal transition temperature (° C.) | 53 | 47 | 43 | 123 | 60 | 52 | 75 | 52 |
| Mn | 17000 | 16000 | 16000 | not dissolved in THF | 18000 | 20000 | 23000 | 22000 |

|  | Preparation Example | | | | | | |
|---|---|---|---|---|---|---|---|
|  | 9 | 10 | 11 | 12 | 13 | 14 | 15 |
| Initially charged HBVE (g) |  | 3 | 3 | 3 | 3 | — | 250 |
| Continuously supplied HBVE (g) | dividedly supplied | 18 | 18 | 1.5 | 1.5 | — | — |
| Initially charged tBVBz (g) | — | — | — | 4.5 | — | — | — |
| Continuously supplied tBVBz (g) | — | — | — | 30 | — | — | — |
| Initially charged CHVE (g) | — | 12 | 12 | — | — | — | 500 |
| Continuously supplied CHVE (g) | — | 28 | 28 | — | — | — | — |
| Initially charged PFBA (g) | — | — | — | — | — | 15 | — |
| Continuously supplied PFBA (g) | — | — | — | — | — | 9 | — |
| Amount of monomer mixture (g) | 65 | 65 | 65 | 70 | 95 | 90 | — |
| Reaction time (hr) | 6 | 6 | 6 | 5 | 12 | 12 | 10 |
| Amount of fluorine-containing copolymer (g) | 113 | 101 | 103 | 115 | 152 | 133 | 805 |
| Components of copolymer (% by mole) | | | | | | | |
| TFE | 35 | 37 | 37 | 35 | 34 | 35 | — |
| HFP | 12 | 12 | 7 | 14 | 12 | 16 | — |
| CTFE | — | — | — | — | — | — | 50 |
| E | 36 | 0 | 3 | — | 47 | 45 | — |
| CHVE | — | 40 | 43 | — | — | — | 16 |
| tBVBz | 10 | — | — | 10 | — | — | — |
| HBVE | 7 | 11 | 10 | 7 | 7 | — | 25 |
| P | — | — | — | 34 | — | — | — |
| PFBA | — | — | — | — | — | 4 | — |
| isoBVE | — | — | — | — | — | — | 9 |
| Total | 100 | 100 | 100 | 100 | 100 | 100 | 100 |
| Physical properties of polymer | | | | | | | |
| Hydroxyl value (mgKOH/g) | 43 | 52 | 49 | 41 | 54 | — | 120 |
| Thermal transition temperature (° C.) | 52 | 57 | 55 | 54 | 48 | 51 | 45 |
| Mn | 18000 | 19000 | 19000 | 18000 | not dissolved in THF | not dissolved in THF | 27000 |

EXPERIMENTAL EXAMPLE 1

In a Henschel mixer (available from Kabushiki Kaisha Aikosha Seisakusho), 50 g of the fluorine-containing polymer prepared in Preparation Example 1, 10.7 g of caprolactam blocked isocyanate (trade name BESTAGON B-1530 available from Hüls Co., Ltd.) as a curing agent, 26.0 g of titanium oxide (trade name TIPURE R-960 available from du Pont) as a pigment, 1.2 g of low molecular weight acrylic copolymer (trade name MODAFLOW available from Monsanto Chemical Co., Ltd.) as a surface modifier and 0.3 g of benzoin as a defoaming agent were uniformly mixed for three minutes. The obtained mixture was melt-kneaded at 120° C. with a twin screw melt-kneader (16 mm twin extruder available from Prism Co., Ltd.), followed by cooling, pulverizing at room temperature for three minutes with a universal pulverizer (available from Ika Co., Ltd.) and then filtering the obtained powder through a 140 mesh screen. Thus a thermosetting powder coating composition was obtained.

Characteristics of this coating composition (storage stability test) and a coating film obtained therefrom (coating thickness, surface smoothness, surface gloss, pencil hardness, impact resistance, weather resistance) were determined. The results are shown in Table 2.

(Characteristics of Coating Composition)

Storage Stability Test:

An amount of 20 g of powder coating composition is put in a 50 ml glass bottle. After sealed, the bottle is stored in a 40° C. constant temperature chamber for one month. After lowering to room temperature, a state of the powder coating composition is observed with naked eyes and is evaluated by the following criteria.

A: There is neither agglomeration nor sticking to walls of the constant temperature chamber, and the composition can be coated without any problem.
B: The composition can be re-dispersed by shaking, and there is no sticking to walls of the constant temperature chamber.
C: The composition can be re-dispersed by shaking, but there is recognized sticking to walls of the constant temperature chamber.
D: The composition cannot be re-dispersed.

When the composition has storage stability of A and B ranks, it can be said that the composition can be used practically.

(Characteristics of Coating Film)

Production of Coated Sample Plate

The powder coating composition is coated on a phosphate-treated aluminum substrate (1 mm thick) at an applied voltage of 40 kV with a corona type powder coating gun (trade name GX3300 available from Onoda Cement Co., Ltd.), followed by baking at 200° C. for 15 minutes immediately after the coating to obtain a sample coated plate (coating thickness: 65 μm). This coated plate is subjected to the following tests. The results are shown in Table 2. Unless otherwise noted, the sample coated plate is allowed to stand at 25° C. for 24 hours or more after the coating and then the tests are carried out at 25° C.

Coating Thickness:

Measured with an eddy-current instrument EL10D for measuring thickness (available from Kabushiki Kaisha Sanko Denshi Kenkyusho)

Surface Smoothness:

When light of fluorescent lamp is reflected on the coating film, a shape (deformation) of the lamp reflecting on the coating film surface is evaluated with naked eyes.
A: No deformation.
B: Slight deformation.
C: Deformation can be seen clearly.
D: Large deformation.

Gloss:

A specular reflection angle at 60 degrees is measured according to JIS K5400.

Pencil Hardness:

Pencil hardness is measured according to JIS K5400.

Impact Resistance (Coating Thickness 65 μm):

A Gardener Impact Tester available from Gardener Co., Ltd. is used. A 16 mm diameter spherical head is set on the coating film surface and a cylinder having a weight of 1 kg is dropped from a given height. An energy applied on a sample is determined from this height. Table 2 shows a maximum energy (J) in which cracking does not occur on the coating film. From practical point of view, impact resistance of not less than 2.5 J (at a coating thickness of 65 μm) is demanded, but in order to meet further strict demand, impact resistance of not less than 3.0 J, further not less than 4.0 J is necessary.

For example, AAMA2605 which is an internal standard of American Architectural Manufacturers Association stipulates that cracking should not occur on a substrate when a 3 mm deep deformation is formed on the substrate. In the case of the 1 mm thick aluminum plate which is used in this experiment, the deformation stipulated in AAMA2605 can be formed with an energy of 2.5 J.

Weather Resistance:

A gloss retention ratio (a ratio of gloss after the test to initial gloss) is determined after an accelerated weathering test is carried out for 1,000 hours according to JIS K5400 9.8.1 with EYE SUPER UV tester model W-13 (trade name) (Light/Dew/Rest=11/11/1 HR is assumed to be one cycle).

EXPERIMENTAL EXAMPLES 2 to 13

Thermosetting powder coating compositions were prepared in the same manner as in Experimental Example 1 except that the fluorine-containing copolymers prepared in Preparation Examples 2 to 13, respectively were used and amounts of other components were changed as shown in Table 2. Characteristics of the coating compositions and coating films obtained therefrom were determined in the same manner as in Experimental Example 1. The results are shown in Table 2.

EXPERIMENTAL EXAMPLE 14

In a Henschel mixer, 100 g of the fluorine-containing copolymer prepared in Preparation Example 14, 4 g of triglycidyl isocyanurate (TGIC available from Rhom & Haas Co., Ltd.), 15 g of titanium oxide, 0.5 g of flowability modifier (MODAFLOW available from Monsanto Chemical Co., Ltd.) and 0.5 g of benzoin were dry-blended at 25° C. for 15 minutes to obtain a uniform mixture. The mixture was melt-kneaded at 100° C. for one minute with a Buss Co-kneader (available from Buss Co., Ltd.), followed by extruding into a sheet and pelletizing. Then 20 g of pellets were pulverized at about 20° C. for 5 minutes with a Micro Hammer Mill (available from Ika Co., Ltd.), and the obtained powder was filtered through a 200 mesh screen to obtain a powder coating composition having an average particle size of 50 μm.

was 65 μm (Experimental Example 15) and 40 μm (Experimental Example 16). The results are shown in Table 2.

In Table 2, Experimental Examples corresponding to Examples of the present invention are Experimental Examples 1, 2, 5, 6, 8, 9, 11 and 12.

TABLE 2

|  | Experimental Example | | | | | | | |
|---|---|---|---|---|---|---|---|---|
|  | 1 | 2 | 3 | 4 | 5 | 6 | 7 | 8 |
| Polymer used (Preparation Example) | 1 | 2 | 3 | 4 | 5 | 6 | 7 | 8 |
| Components of coating composition (g) | | | | | | | | |
| Fluorine-containing polymer | 50.0 | 50.0 | 50.0 | 50.0 | 50.0 | 50.0 | 50.0 | 50.0 |
| Curing agent | 10.7 | 13.4 | 17.2 | 9.1 | 9.3 | 13.6 | 9.6 | 10.6 |
| Pigment | 26.0 | 27.2 | 28.8 | 25.3 | 25.4 | 27.3 | 25.6 | 26.0 |
| Surface modifier | 1.2 | 1.3 | 1.3 | 1.2 | 1.2 | 1.3 | 1.2 | 1.2 |
| Benzoin | 0.3 | 0.3 | 0.3 | 0.3 | 0.3 | 0.3 | 0.3 | 0.3 |
| Characteristics of coating composition | | | | | | | | |
| Storage stability | A | B | D | A | A | A | A | B |
| Characteristics of coating film | | | | | | | | |
| Coating thickness (μm) | 65 | 65 | 65 | 65 | 65 | 65 | 65 | 65 |
| Surface smoothness | A | A | A | D | A | A | B | A |
| Surface gloss (%) | 75 | 73 | 59 | 45 | 77 | 70 | 56 | 76 |
| Pencil hardness | H | F | F | HB | H | F | H | H |
| Impact resistance (J) | 5.0 | 5.0 | 5.0 | 4.0 | 4.0 | 4.5 | 2.5 | 3.5 |
| Weather resistance (%) | 98 | 98 | 99 | 92 | 82 | 95 | 50 | 98 |

|  | Experimental Example | | | | | | | |
|---|---|---|---|---|---|---|---|---|
|  | 9 | 10 | 11 | 12 | 13 | 14 | 15 | 16 |
| Polymer used (Preparation Example) | 9 | 10 | 11 | 12 | 13 | 14 | 15 | 15 |
| Components of coating composition (g) | | | | | | | | |
| Fluorine-containing polymer | 50.0 | 50.0 | 50.0 | 50.0 | 55.5 | 100.0 | 43.5 | 43.5 |
| Curing agent | 10.7 | 13.0 | 12.3 | 10.2 | 14.0 | 4.0 | 26.0 | 26.0 |
| Pigment | 26.0 | 27.0 | 26.7 | 25.8 | 30.0 | 15.0 | 30.0 | 30.0 |
| Surface modifier | 1.2 | 1.3 | 1.2 | 1.2 | 0.5 | 0.5 | 0.5 | 0.5 |
| Benzoin | 0.3 | 0.3 | 0.3 | 0.3 | — | 0.5 | — | — |
| Characteristics of coating composition | | | | | | | | |
| Storage stability | A | A | A | A | B | A | B | B |
| Characteristics of coating film | | | | | | | | |
| Coating thickness (μm) | 65 | 65 | 65 | 65 | 65 | 65 | 65 | 40 |
| Surface smoothness | A | B | B | A | A | A | A | B |
| Surface gloss (%) | 68 | 66 | 65 | 75 | 35 | 60 | 80 | 85 |
| Pencil hardness | F | H | H | H | F | HB | H | H |
| Impact resistance (J) | 4.0 | 2.0 | 3.0 | 4.5 | 1.5 | 1.0 | 1.0 | 3.5 |
| Weather resistance (%) | 89 | 96 | 97 | 98 | 98 | 95 | 95 | 95 |

Characteristics of the coating composition and coating film obtained therefrom were determined in the same manner as in Experimental Example 1. The results are shown in Table 2.

EXPERIMENTAL EXAMPLES 15 and 16

Thermosetting powder coating compositions were prepared in the same manner as in Experimental Example 1 except that the fluorine-containing copolymer prepared in Preparation Example 15 was used and amounts of other components were changed as shown in Table 2. Characteristics of the coating compositions and coating films obtained therefrom were determined in the same manner as in Experimental Example 1 except that the obtained powder coating compositions were used and a thickness of the coating film

INDUSTRIAL APPLICABILITY

The present invention can provide a thermosetting powder coating composition which is excellent in storage stability and provides a coating film possessing a smooth surface and enhanced impact resistance.

The invention claimed is:

1. A thermosetting powder coating composition comprising (A1) a fluorine-containing copolymer and (B) a curing agent, in which said copolymer contains, as essential structural units, a fluoroolefin unit, an alkene unit and p-tertiary butyl vinyl benzoate unit, has the p-tertiary butyl vinyl benzoate unit in an amount of from 5 to 20% by mole, has a thermal transition temperature of from 45° to 120° C. and has a crosslinkable reaction group.

2. The composition of claim 1, wherein the fluorine-containing copolymer (A1) contains the alkene unit in an amount of from 1 to 45% by mole.

3. The composition of claim 1, wherein the fluorine-containing copolymer (A1) contains tetrafluoroethylene, hexafluoropropylene and/or chlorotrifluoroethylene units.

4. The composition of claim 1, wherein the alkene unit is an ethylene unit.

5. A fluorine-containing copolymer comprising from 10 to 55% by mole of fluoroolefin unit, from 1 to 45% by mole of alkene unit, from 5 to 20% by mole of p-tertiary butyl vinyl benzoate unit, from 1 to 20% by mole of structural unit having a crosslinkable reaction group and from 0 to 30% by mole of structural unit other than said units, wherein the copolymer has a thermal transition temperature of from 45° to 120° C.

6. The fluorine-containing copolymer of claim 5, wherein the alkene unit is an ethylene unit.

7. A process for preparing the fluorine-containing copolymer of claim 5 which comprises copolymerizing fluoroolefin, alkene, p-tertiary butyl vinyl benzoate, monomer having a crosslinkable reaction group and monomer other than said monomers as an optional component while continuously supplying at least one of those monomers.

8. The composition of claim 1, wherein the fluorine-containing copolymer (A1) contains a cyclohexyl vinyl ether unit in a sum of cyclohexyl vinyl ether unit and p-tertiary butyl vinyl benzoate unit of at most 45% by mole.

9. The fluorine-containing copolymer of claim 5, wherein a cyclohexyl vinyl ether unit is further contained in a sum of cyclohexyl vinyl ether unit and p-tertiary butyl vinyl benzoate unit of at most 45% by mole.

10. The process of claim 7, wherein the fluorine-containing copolymer further contains a cyclohexyl vinyl ether unit in a sum of cyclohexyl vinyl ether unit and p-tertiary butyl vinyl benzoate unit of at most 45% by mole.

* * * * *